(12) United States Patent
Bruckman

(10) Patent No.: US 6,892,329 B2
(45) Date of Patent: May 10, 2005

(54) SELECTIVE PROTECTION FOR RING TOPOLOGIES

(75) Inventor: Leon Bruckman, Petach Tikva (IL)

(73) Assignee: Corrigent Systems Ltd., Tel Aviv (IL)

( * ) Notice: Subject to any disclaimer, the term of this patent is extended or adjusted under 35 U.S.C. 154(b) by 496 days.

(21) Appl. No.: 09/969,839

(22) Filed: Oct. 3, 2001

(65) Prior Publication Data
US 2002/0144190 A1 Oct. 3, 2002

Related U.S. Application Data

(60) Provisional application No. 60/281,232, filed on Apr. 2, 2001.

(51) Int. Cl.[7] ............................................. G06F 11/16
(52) U.S. Cl. ...................... 714/43; 714/4; 714/717; 709/251; 370/224
(58) Field of Search .......................... 714/4, 43, 717; 709/251; 370/222, 223, 224

(56) References Cited

U.S. PATENT DOCUMENTS 5,159,595 A * 10/1992 Flanagan et al. ............. 714/4
5,307,353 A * 4/1994 Yamashita et al. ........... 714/4
5,925,137 A * 7/1999 Okanoue et al. ............. 714/4
6,246,667 B1 * 6/2001 Ballintine et al. ............ 714/4
6,680,906 B1 * 1/2004 Nguyen ..................... 370/229

FOREIGN PATENT DOCUMENTS

EP          1 052 808      11/2000
WO          WO 00/74318    12/2000

OTHER PUBLICATIONS

Harrera et al., "A Framework for IP over Packet Transport Rings", Internet Draft, draft–ietf–ipoptr–framework–00, Jun. 2001.

D. Tsiang et al., Request for Comments (RFC) 2892 of the Internet Engineering Task Force (IETF), Aug. 2000.

* cited by examiner

Primary Examiner—Robert Beausoliel
Assistant Examiner—Joseph D Manoskey
(74) Attorney, Agent, or Firm—Ladas & Parry LLP

(57) ABSTRACT

A method for fault protection in a bidirectional ring network includes transmitting first and second flows of packets around the bidirectional ring network while defining the first flow as a wrapping flow and the second flow as a non-wrapping flow. Upon detection by a node in the network that a segment of the network proximal to the node has failed, the packets in the first flow are wrapped at the node between clockwise and counterclockwise directions on the network so as to avoid the failed segment, while the packets in the second flow are not wrapped.

24 Claims, 3 Drawing Sheets

SELECTIVE PROTECTION FOR RING TOPOLOGIES

CROSS-REFERENCE TO RELATED APPLICATION

This application claims the benefit of U.S. Provisional Patent Application No. 60/281,232, filed Apr. 2, 2001, which is incorporated herein by reference.

FIELD OF THE INVENTION

The present invention relates generally to network communication systems and protocols, and specifically to methods of fault protection in packet-switched networks.

BACKGROUND OF THE INVENTION

Network ring topologies are gaining in popularity, particularly in Internet Protocol (IP) networks. Such networks enable carriers to offer large bandwidth to users in a cost-effective manner, since each node in the network needs only two interfaces, rather than having to maintain a separate interface for each of the other nodes as in a mesh network. Ring networks also lend themselves to fast rerouting in the event of network failures, since two alternative routes—in clockwise and counterclockwise directions—are generally available for connecting any two nodes on the ring.

A drawback of traditional ring implementations, such as SONET/SDH, is that one of the directions is designated as the active ring, while the other direction remains on standby for fault protection when needed. In other words, at any given time, all of the nodes in the ring transmit and receive data only in the active direction. Therefore, ordinarily half of the available bandwidth in these rings is reserved for fault protection and is not exploited under normal operating conditions.

Some recently-developed bidirectional protocols provide more efficient bandwidth utilization by enabling data to be transferred between any pair of nodes in either direction around the ring, while maintaining fast protection against faults. The two opposing traffic directions are commonly referred to as an inner ring and an outer ring. It will be understood, however, that in the context of the present patent application and in the claims, the terms "inner" and "outer," as well as "clockwise" and "counterclockwise," are used arbitrarily to distinguish between the two opposing directions of packet flow in a ring network. These terms are chosen solely for convenience of explanation, and do not necessarily bear any relation to the physical characteristics of the network.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents are incorporated herein by reference. They are available at www.ietf.org.

Using protocols such as these, each node in a ring network can communicate directly with all other nodes through either the inner or the outer ring, using the appropriate Media Access Control (MAC) addresses of the nodes. Each packet sent over one of the rings carries a header indicating its destination node. The destination node recognizes its address in the header and strips the packet from the ring. All other nodes pass the packet onward transparently around the ring.

When a failure occurs in a link on a bidirectional ring network, packets destined to traverse the failed link on one of the rings must be rapidly rerouted so as to reach their destination via the other ring. This rerouting is known in the art as "protection." Two schemes are used for this purpose: wrapping and steering. Wrapping, which is the method used in SRP rings, is achieved by looping back the packet stream at the nodes that are adjacent to the failed link. Thus, packets reaching the failed link on the inner ring are looped back to travel to their destination via the outer ring, and vice versa. In this manner, protection is carried out simply by the nodes that are adjacent to the failed link. In steering-based protection, on the other hand, each of the nodes is informed of the failed link. Each node then steers all of its traffic accordingly onto the ring that reaches the desired destination without passing through the failed link.

Wrapping is advantageous in terms of its speed and simplicity, since only the nodes that detect the failure need to carry out the protection function. It is not even necessary to inform the other nodes that a failure has occurred. A disadvantage of wrapping is that the protected packets must travel a much longer path to reach their destinations. The availability of network resources is also reduced, since protected packets travel through all of the segments of the network at least once, and often twice. Furthermore, when the failure is fixed and wrapping is terminated, some packets are likely to reach their destinations out of order, since they can now travel again over their original path, which is much shorter than the wrapped path being used by earlier packets. As a result, wrapping is problematic as a protection mechanism for real-time traffic, such as voice or video, which is sensitive to jitter and packet misordering.

Real-time traffic is therefore better handled by steering, despite the increased complexity of this method. Because steering requires that all nodes be informed and implement the failure protection, its initiation is inherently slower than wrapping. The nodes must be linked by a suitable protection protocol so that they can notify one another of failure conditions. A failure notification packet sent by a node under the protocol must then traverse the entire ring in order to update all of the other nodes. Packets that are transmitted between the time that the failure occurs and the initiation of steering are generally lost. In some data applications the loss of even one packet can lead to an entire frame or block of data being discarded. Therefore, packet losses due to protection should be held to a minimum.

It is thus evident that while wrapping is generally the better protection scheme for block data applications, steering is superior for real-time traffic. Since modern packet networks typically carry both types of traffic, neither wrapping nor steering provides an optimal solution. In SRP, as described in the above-mentioned RFC 2892 (section 3.4), the two schemes are combined by first wrapping and then steering traffic following a failure. In this case, however, the real-time traffic is disrupted twice: first when the failure occurs and wrapping begins, and subsequently when steering takes over, since the steered path is shorter than the wrapped path. Thus, there is still a need for a protection solution that meets the needs of both block data and real-time traffic.

SUMMARY OF THE INVENTION

It is an object of the present invention to provide improved methods of protection, as well as devices implementing such methods, for use in ring networks.

It is a further object of some aspects of the present invention to provide methods of protection that can be optimized for different types of traffic simultaneously.

In preferred embodiments of the present invention, a bidirectional ring network is arranged so that upon occurrence of a failure in one of the network links, certain classes of packets are wrapped, while others are not. Preferably, data services that are not sensitive to delays and can handle packet misordering are wrapped, so as to minimize the number of packets lost due to the failure, while real-time services, which are sensitive to jitter and misordering, are not wrapped. Most preferably, steering is applied to the real-time services, while the delay-insensitive data services are wrapped. Alternatively, after the initial wrapping period, during which steering is established, the data services may be steered as well. Further alternatively, certain services may be wrapped and, optionally, steered thereafter, while other services are simply discarded, so as to ensure that there is sufficient bandwidth available on the network for protected, high-priority traffic under fault conditions.

In some preferred embodiments of the present invention, this selective wrapping is implemented by adding a flag to each packet, indicating whether or not the packet is to be wrapped. After a node has detected a failure in an adjacent link, it checks the flag in each packet that it receives in order to decide whether to wrap, to pass or to discard the packet. Whether a given class of packets should have the wrap flag set or reset is typically determined by the sending node depending on the type of service involved (for example, data or real-time). Alternatively or additionally, the flag setting may depend on the identity of the user sending the packet or on other factors set by a system operator. Further alternatively, in other embodiments the wrapping flag is not used, and instead, nodes decide which packets to wrap based on other information carried by the packets, such as the source or destination address or protocol type.

Thus, preferred embodiments of the present invention provide a simple, flexible solution to the problem of protection in mixed-traffic ring networks. As noted above, neither wrapping nor steering, nor wrapping followed by steering as provided by SRP, gives an optimal solution for all types of traffic in such networks.

There is therefore provided, in accordance with a preferred embodiment of the present invention, a method for fault protection in a bidirectional ring network, in which packet traffic is transmitted simultaneously in both clockwise and counterclockwise directions around the network, the method including:

transmitting first and second flows of packets around the bidirectional ring network while defining the first flow as a wrapping flow and the second flow as a non-wrapping flow; and upon detection by a node in the network that a segment of the network proximal to the node has failed, wrapping the packets in the first flow at the node between the clockwise and counterclockwise directions so as to avoid the failed segment, while the packets in the second flow are not wrapped.

The packets in the second flow that reach the node may be passed or discarded.

Additionally or alternatively, the method includes steering the packets in the second flow in one of the clockwise and counterclockwise directions so as to reach a destination of the second flow while avoiding the failed segment. Preferably, steering the packets in the second flow includes sending a failure indication message from the node detecting the failed segments to a source node of the second flow, and initiating the steering of the packets in the second flow responsive to the message. Most preferably, the method includes, when the steering of the packets in the second flow is initiated, steering the packets in the first flow, as well, and discontinuing the wrapping of the packets.

Further additionally or alternatively, the method includes sending a failure indication message from the node detecting the failed segments to other nodes in the network and, after the other nodes have received the message, steering the packets in the first flow in one of the clockwise and counterclockwise directions so as to reach a destination of the first flow while avoiding the failed segment, and discontinuing the wrapping of the packets. Typically, the packets in the second flow are discarded as long as the failure continues.

Preferably, transmitting the first and second flows includes setting a wrapping flag in the packets in the first flow, while resetting the wrapping flag in the packets in the second flow, and wrapping the packets includes determining the packets to be wrapped responsive to the wrapping flag.

In a preferred embodiment, transmitting the second flow includes providing a real-time service, while transmitting the first flow includes providing a data transmission service that is substantially more tolerant of delay variations and misordering in delivery of the packets than is the real-time service. Typically, the real-time service includes at least one of a packetized voice service and a packetized video service.

There is also provided, in accordance with a preferred embodiment of the present invention, communication apparatus, including:

a communication medium; and a plurality of communication nodes, mutually coupled by the communication medium so as to form a ring network, over which the nodes are configured to transmit traffic to the other nodes in both clockwise and counterclockwise directions, the traffic including a first flow of packets defined as a wrapping flow and a second flow of the packets defined as a non-wrapping flow, the nodes being adapted so that upon detection by a given node among the nodes in the network that a segment of the network proximal to the given node has failed, the packets in the first flow are wrapped at the given node between the clockwise and counterclockwise directions so as to avoid the failed segment, while the packets in the second flow are not wrapped.

There is additionally provided, in accordance with a preferred embodiment of the present invention, a communication device, for operation as a node in a ring network over which traffic is transmitted in both clockwise and counterclockwise directions, the device including:

a traffic processing block, adapted to prepare outgoing data packets for transmission over the ring network, such that the packets belong either to a first flow of the packets defined as a wrapping flow or to a second flow of the packets defined as a non-wrapping flow; and a media access control (MAC) block, interfacing to the traffic processing block and adapted to be coupled to the network so as to transmit the outgoing data packets and to receive incoming packets over the ring network in both of the clockwise and counterclockwise directions, and further adapted to detect a failure of a segment of the network proximal to the device, and responsive to the failure, to wrap the packets belonging to the first flow between the clockwise and counterclockwise directions so as to avoid the failed segment, without wrapping the packets in the second flow.

The present invention will be more fully understood from the following detailed description of the preferred embodiments thereof, taken together with the drawings in which:

DETAILED DESCRIPTION OF PREFERRED EMBODIMENTS

Figure 1:
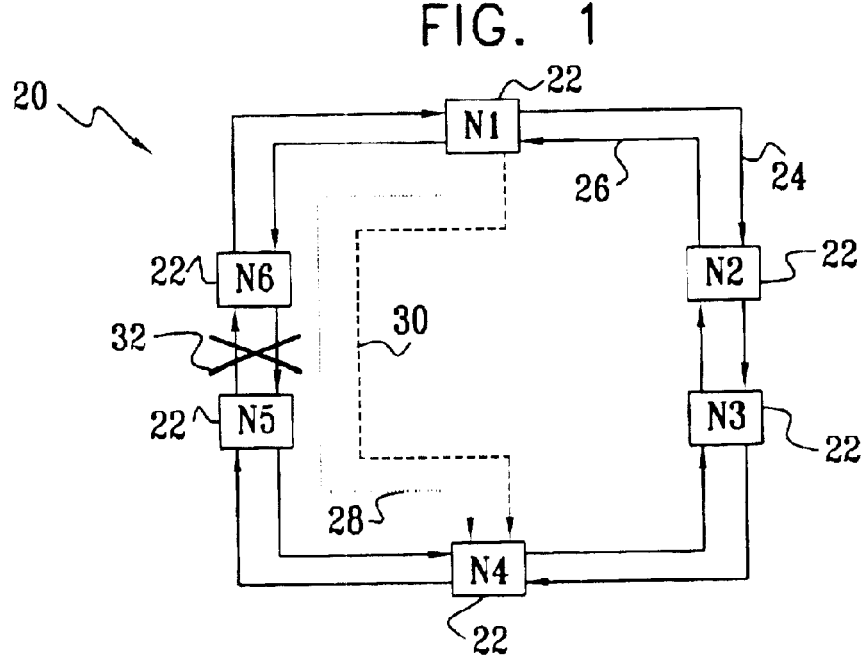
FIG. 1 is a block diagram that schematically illustrates a bidirectional ring network, in accordance with a preferred embodiment of the present invention.

FIG. 1 is a block diagram that schematically shows a packet ring network 20, in accordance with a preferred embodiment of the present invention. Network 20 comprises nodes 22, marked N1 through N6, which are mutually connected by bidirectional communication media, such as optical fibers or conductive wires. The nodes typically comprise switching equipment, and serve as either access points or gateways to other networks (aggregation points). The communication media in network 22 are configured to define an outer ring 24, over which packets are conveyed between the nodes in a clockwise direction, and an inner ring 26, over which the packets are conveyed in a counterclockwise direction. As noted above, however, the designations of "inner," "outer," "clockwise" and "counterclockwise" are arbitrary and are used here simply for convenience and clarity of explanation. Furthermore, the designation and number of nodes in network 20 are chosen here by way of example, and the network may, by the same token, comprise a greater or smaller number of nodes.

Figure 2:
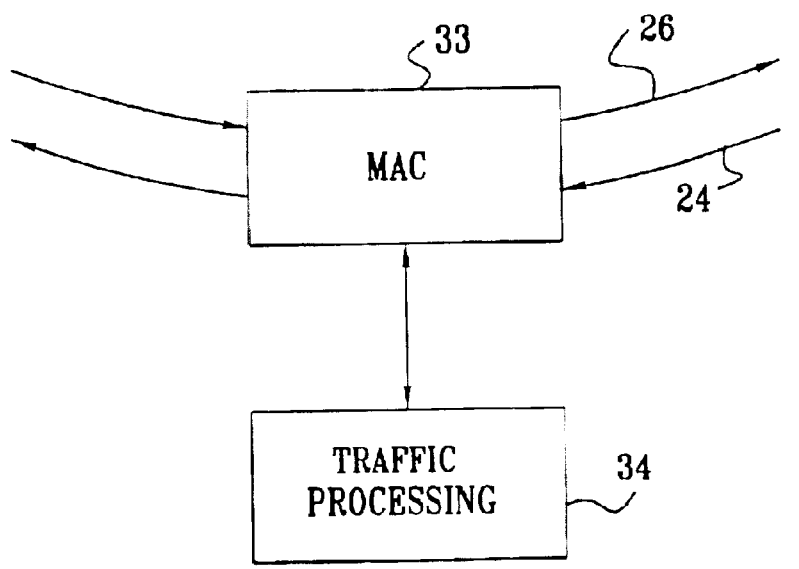
FIG. 2 is a block diagram that schematically shows details of a node in the network of FIG. 1, in accordance with a preferred embodiment of the present invention.

FIG. 2 is a block diagram that schematically shows details of one of nodes 22 in network 20, in accordance with a preferred embodiment of the present invention. Node 22 comprises a media access control (MAC) block 33, connected to transmit and receive data over both of rings 24 and 26. Block 33 is responsible for ring management and performs the MAC-layer functions of capturing packets that are addressed to node 22 on either ring, while passing all other traffic through to the next node along the ring. Preferably, block 33 operates in accordance with the RPR protocol described in the Background of the Invention, or with another, similar bidirectional protocol. The basic ring protocol is extended by a protection protocol that provides for selective wrapping, in accordance with a preferred embodiment of the present invention, as described in detail hereinbelow.

When MAC block 33 captures a packet addressed to its own node 22, it delivers the packet to a traffic processing block 34 of the node. Block 34 is responsible for network-layer functions, such as IP processing, and optionally other higher-level functions, such as Quality of Service (QoS) and network security. In a node that serves as an access point, for example, block 34 is typically responsible for delivery of packets to users who are connected to network 20 through the node and for receiving packets from the users for transmission over network 20.

In accordance with the protection protocol applied in network 20, packets traveling over the network contain a wrapping flag, preferably in the form of a single bit at a specified location at or near the beginning of each packet. Traffic processing block 34 preferably sets or resets the wrapping flag in each packet that it transmits into the network. Typically, the setting of the wrapping flag depends on the type of service to which the packet belongs. Additionally or alternatively, the flag setting may depend on the identity of a user sending the packets (and particularly on the QoS level for which the user has contracted), or on other criteria set by the user or by a manager of network 20.

Returning now to the example shown in FIG. 1, two packet flows 28 and 30 are directed from source node N1 via intermediate nodes N6 and N5 to destination node N4 over inner ring 26. For the sake of this example, we assume that flow 28 belongs to a data service, which transfers blocks of data in accordance with a protocol that is relatively insensitive to jitter and packet misordering, such as an electronic mail application or another data transfer application running over TCP/IP. Flow 30, on the other hand, is assumed to belong to a real-time service, such as a voice over IP (VOIP) or streaming video service, which can tolerate occasional dropped packets but is sensitive to jitter and misordering. The wrapping flag is set in the packets of flow 28, but is reset in the packets of flow 30. Both of these flows are interrupted by a link failure 32 between nodes N5 and N6.

Figure 3A:
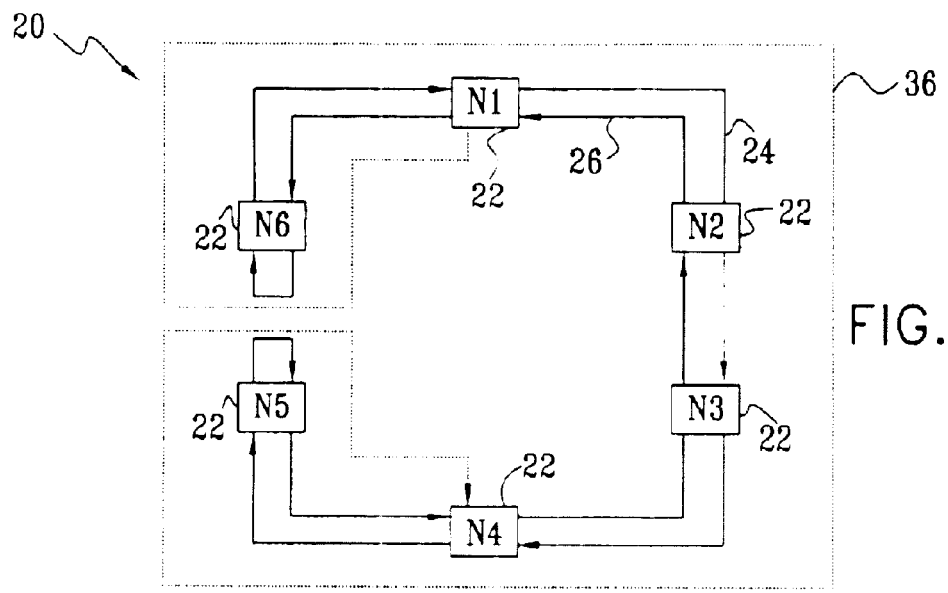
FIGS. 3A and 3B are block diagrams that schematically illustrate protection mechanisms implemented in the network of FIG. 1 in response to a link failure, in accordance with a preferred embodiment of the present invention.
Figure 3B:
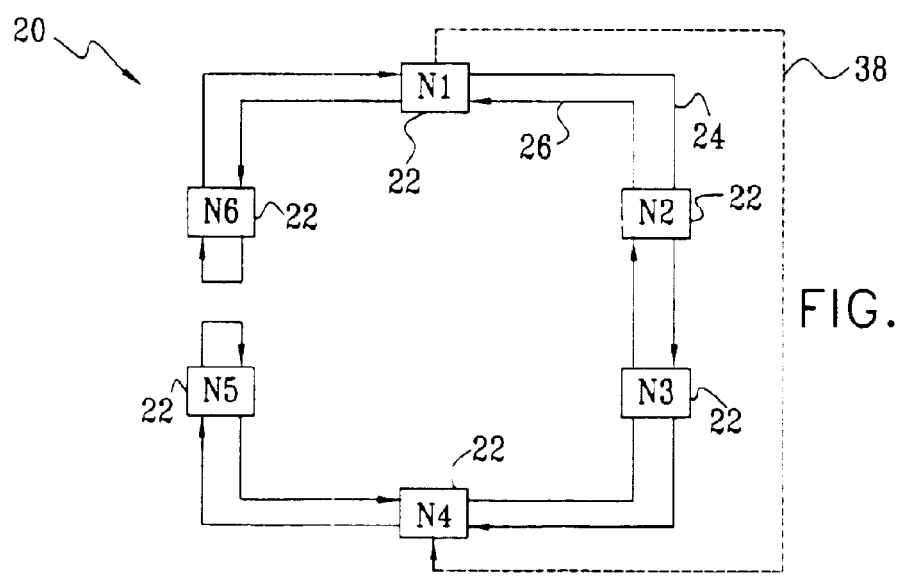

FIGS. 3A and 3B schematically illustrate how network 20 handles failure 32 for the two different types of service exemplified by flows 28 and 30, in accordance with a preferred embodiment of the present invention. Although for the sake of clarity, FIGS. 3A and 3B are separated, in practice the protection mechanisms illustrated in the two figures can operate simultaneously. In FIG. 3A, it is seen that flow 28 is wrapped onto outer ring 24 at nodes N6 and N5, thus defining a wrapped flow path 36. Meanwhile, flow 30 is steered by ring N1 onto outer ring 24, thus defining a steered flow path 38. Because flow 30 is flagged as a non-wrapping flow, any packets in flow 30 that reach node N6 before N1 begins steering the packets onto the outer ring will typically be discarded. There may, additionally or alternatively, be flows (not shown) in network 20 that are neither flagged for wrapping nor steered. The packets in these flows will simply be discarded if they reach nodes N5 and N6 while failure 32 continues. As a further alternative, flow 28 may be wrapped temporarily on path 36, typically until all of the nodes in network 20 have been notified of failure 32 and are ready to begin steering. At this point, flow path 36 is suspended, and instead, flow 28 is steered along flow path 38.

Figure 4:
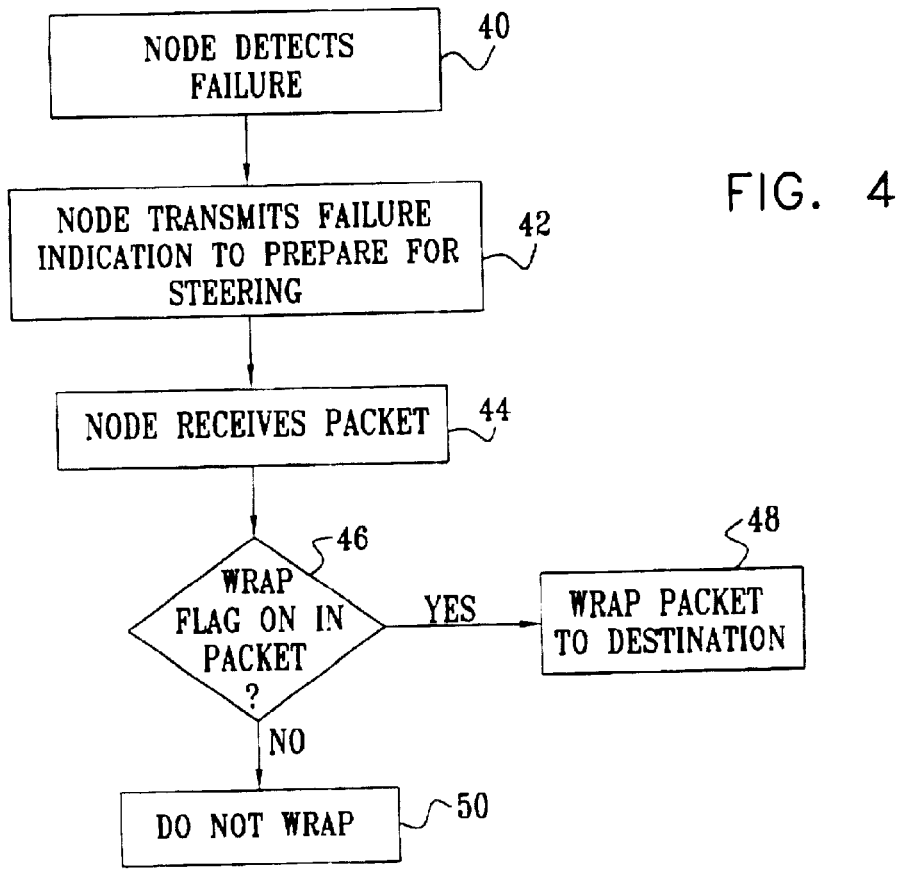
FIGS. 4 and 5 are flow charts that schematically illustrate methods for failure protection in a ring network, in accordance with a preferred embodiment of the present invention.
Figure 5:
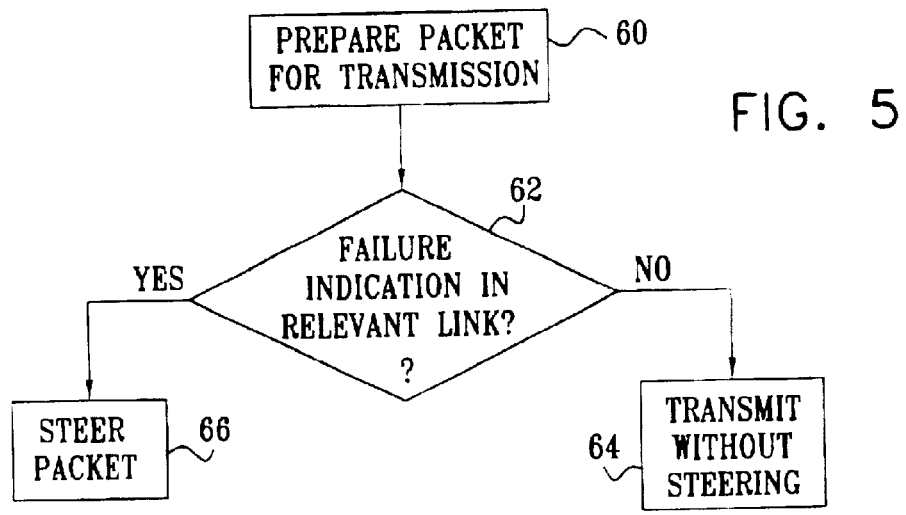

Reference is now made to FIGS. 4 and 5, which are flow charts that schematically illustrate methods for failure protection in network 20, in accordance with a preferred embodiment of the present invention. The method is described, by way of example, with reference to flows 28 and 30. It is assumed that the packets in flow 28 are flagged for wrapping, while those in flow 30 are not flagged and are instead steered. FIG. 4 describes the behavior of a node adjacent to the link on which failure 32 occurred, such as node N6, while FIG. 5 refers to a node originating a packet flow, such as node N1. Extension of the method to other node configurations and to alternative protection schemes, such as those noted above, is straightforward.

The method of FIG. 4 is initiated when node N6 detects link failure 32, at a failure detection step 40. Immediately upon detecting the failure, N6 transmits a failure indication packet around ring 24, at a notification step 42, to notify the other nodes of the failure. (Node N5 typically detects the failure as well, and accordingly transmits a failure indication packet around ring 26.) Node N6 subsequently receives packets on ring 26, at a packet reception step 44, and determines how to handle each packet individually. The node checks the packet header to determine whether the wrapping flag is set or reset, at a flag checking step 46. If the flag is set, node N6 wraps the packet from ring 26 onto ring 24, at a wrapping step 48. In the case of flow 28, the packet is wrapped onto path 36. When the packet reaches node N5, the wrapping flag is checked again, and the packet is accordingly wrapped back onto ring 26, on which it finally reaches destination node N4.

After transmitting the failure indication packet at step 42, but before node N1 is ready to steer flow 30 onto path 38, node N6 may still receive packets belonging to flow 30. Since the wrapping flag of these packets is not set, node N6 simply passes the packets on without wrapping, at a non-wrap step 50. As a result, these packets are discarded.

As shown in FIG. 5, node N1 prepares packets in flows 28 and 30 for transmission, at a packet preparation step 60. In the absence of a failure in the network, the packets are destined for transmission on a route through nodes N6 and N5. Before transmitting the packets, N1 checks to ascertain whether any failures are known to have occurred in the links that each flow is to traverse, at a failure checking step 62. As long as none of the other nodes has reported such a failure, and N1 has not detected a failure itself, the packets are transmitted along the normal route, without steering, at a normal transmission step 64. If failure 32 has occurred, but the failure indication from N6 has not yet reached N1, the packets will still be transmitted on the normal route. In this case, the packets in flow 28 are wrapped by N6, as noted above, but packets in flow 30 are passed through by N6 at step 50 and thus will be discarded.

Once N1 receives the failure indication, it begins steering the packets in flow 30 onto path 38, at a steering step 66. Similarly, node N6 and the other nodes in network 20 begin at this point steering packet flows that they originate to the appropriate destinations. Preferably, to save network resources, N1 and the other nodes also steer wrapped flows, such as flow 28. Alternatively, for the duration of the failure, only some flows are steered, while others are wrapped or are delayed or discarded to conserve network resources.

Although preferred embodiments are described herein with reference to certain specific types of networks and protocols, and particularly to packet networks based on the RPR protocol, the principles of the present invention are similarly applicable in bidirectional ring networks and protocols of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for fault protection in a bidirectional ring network, in which packet traffic is transmitted simultaneously in both clockwise and counterclockwise directions around the network, the method comprising:

transmitting first and second flows of packets around the bidirectional ring network while defining the first flow as a wrapping flow and the second flow as a non-wrapping flow; and upon detection by a node in the network that a segment of the network proximal to the node has failed;

wrapping the packets in the first flow at the node between the clockwise and counterclockwise directions so as to avoid the failed segment; and steering the packets in the second flow in one of the clockwise and counterclockwise directions so as to reach a destination of the second flow while avoiding the failed segment.

2. A method according to claim 1, wherein the packets in the second flow that reach the node prior to initiation of the steering are discarded.

3. A method according to claim 1, wherein steering the packets in the second flow comprises sending a failure indication message from the node detecting the failed segments to a source node of the second flow, and initiating the steering of the packets in the second flow responsive to the message.

4. A method according to claim 3, and comprising, when the steering of the packets in the second flow is initiated, steering the packets in the first flow, as well, and discontinuing the wrapping of the packets.

5. A method according to claim 1, and comprising sending a failure indication message from the node detecting the failed segments to other nodes in the network and, after the other nodes have received the message, steering the packets in the first flow in one of the clockwise and counterclockwise directions so as to reach a destination of the first flow while avoiding the failed segment, and discontinuing the wrapping of the packets.

6. A method according to claim 1, wherein transmitting the first and second flows comprises setting a wrapping flag in the packets in the first flow, while resetting the wrapping flag in the packets in the second flow, and wherein wrapping the packets comprises determining the packets to be wrapped responsive to the wrapping flag.

7. A method according to claim 1, wherein transmitting the second flow comprises providing a real-time service, while transmitting the first flow comprises providing a data transmission service that is substantially more tolerant of delay variations and misordering in delivery of the packets than is the real-time service.

8. A method according to claim 7, wherein the real-time service comprises at least one of a packetized voice service and a packetized video service.

9. Communication apparatus, comprising:

a communication medium; and a plurality of communication nodes, mutually coupled by the communication medium so as to form a ring network, over which the nodes are configured to transmit traffic to the other nodes in both clockwise and counterclockwise directions, the traffic comprising a first flow of packets defined as a wrapping flow and a second flow of the packets defined as a non-wrapping flow, the nodes being adapted so that upon detection by a given node among the nodes in the network that a segment of the network proximal to the given node has failed, the packets in the first flow are wrapped at the given node between the clockwise and counterclockwise directions so as to avoid the failed segment, while the packets in the second flow are steered in one of the clockwise and counterclockwise directions so as to reach a destination of the second flow while avoiding the failed segment.

10. Apparatus according to claim 9, wherein the packets in the second flow that reach the given node prior to initiation of steering the rackets are discarded.

11. Apparatus according to claim 9, wherein the given node is adapted to send a failure indication message to a source node of the second flow among the nodes in the network, which is adapted to initiate steering of the packets in the second flow responsive to the message.

12. Apparatus according to claim 11, wherein the nodes are further adapted, when the steering of the packets in the second flow is initiated, to steer the packets in the first flow, as well, whereupon the given node discontinues wrapping of the packets.

13. Apparatus according to claim 9, wherein the given node is adapted to send a failure indication message to the other nodes in the network, and wherein the nodes are adapted, after receiving the message, to steer the packets in the first flow in one of the clockwise and counterclockwise directions so as to reach a destination of the first flow while avoiding the failed segment, whereupon the given node discontinues wrapping of the packets.

14. Apparatus according to claim 9, wherein the nodes transmitting the first and second flows are adapted to set a wrapping flag in the packets in the first flow, while resetting the wrapping flag in the packets in the second flow, wherein the given node is adapted to identify the packets to be wrapped responsive to the wrapping flag.

15. Apparatus according to claim 9, wherein the second flow belongs to a real-time service, while the first flow comprises a data transmission service that is substantially more tolerant of delay variation and misordering in delivery of the packets than is the real-time service.

16. Apparatus according to claim 15, wherein the real-time service comprises at least one of a packetized voice service and a packetized video service.

17. A communication device, for operation as a node in a ring network over which traffic is transmitted in both clockwise and counterclockwise directions, the device comprising:

a traffic processing block, adapted to prepare outgoing data packets for transmission over the ring network, such that the packets belong either to a first flow of the packets defined as a wrapping flow or to a second flow of the packets defined as a non-wrapping flow; and a media access control (MAC) block, interfacing to the traffic processing block and adapted to be coupled to the network so as to transmit the outgoing data packets and to receive incoming packets over the ring network in both of the clockwise and counterclockwise directions, and further adapted to detect a failure of a segment of the network proximal to the device, and responsive to the failure, to wrap the packets belonging to the first flow between the clockwise and counterclockwise directions so as to avoid the failed segment, and to steer the packets in the second flow in one of the clockwise and counterclockwise directions so as to reach a destination of the second flow while avoiding the failed segment.

18. A device according to claim 17, wherein packets in the second flow that reach the MAC block after occurrence of the failure and before initiation of steering the packets are discarded.

19. A device according to claim 17, wherein the MAC block is adapted to send a failure indication message over the network to a source node of the second flow, so as to cause the source node to initiate steering of the packets in the second flow responsive to the message.

20. A device according to claim 19, wherein the MAC block is further adapted, when the steering of the packets in the second flow is initiated, to steer the packets in the first flow, as well, and thereupon to discontinue wrapping of the packets.

21. A device according to claim 17, wherein the MAC block is adapted to send a failure indication message to other nodes in the network, which are adapted, after receiving the message, to steer the packets in the first flow in one of the clockwise and counterclockwise directions so as to reach a destination of the first flow while avoiding the failed segment, whereupon the MAC block discontinues wrapping of the packets.

22. A device according to claim 17, wherein the traffic processing block is adapted to set a wrapping flag in the packets in the first flow, and to reset the wrapping flag in the packets in the second flow, and wherein the MAC block is adapted to identify the packets to be wrapped responsive to the wrapping flag.

23. A device according to claim 17, wherein the second flow belongs to a real-time service, while the first flow comprises a data transmission service that is substantially more tolerant of delay variation and misordering in delivery of the packets than is the real-time service.

24. A device according to claim 23, wherein the real-time service comprises at least one of a packetized voice service and a packetized video service.

* * * * *